Oct. 22, 1929.  A. S. MOONEY  1,732,980
EDUCATIONAL DEVICE
Filed Aug. 15, 1927
Fig. 1.
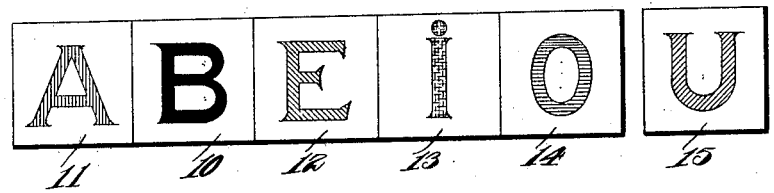
Fig. 2.
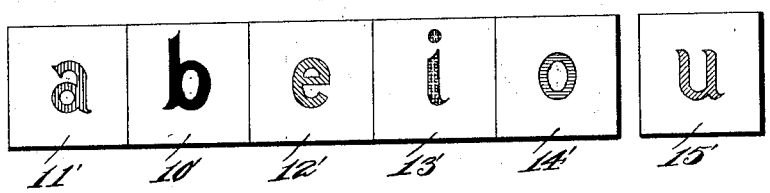
Fig. 3.
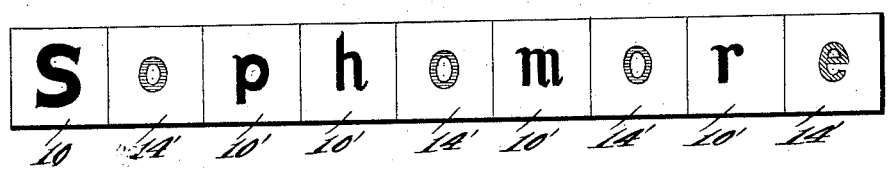
Fig. 4.
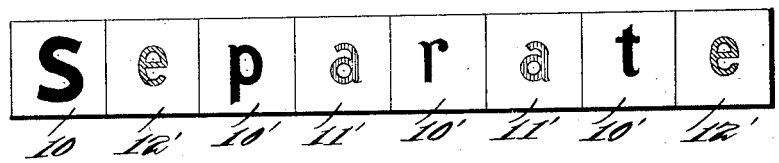
Fig. 5.
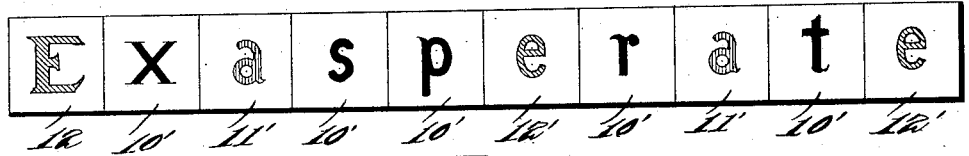
Fig. 6  Fig. 7  Fig. 8
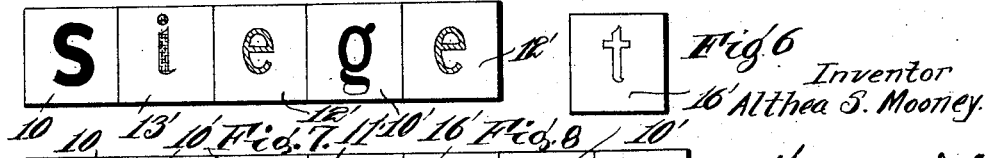
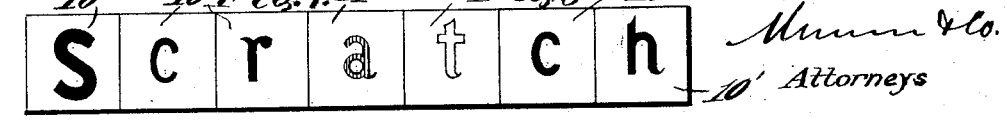
Inventor
Althea S. Mooney.
Attorneys Patented Oct. 22, 1929

1,732,980

UNITED STATES PATENT OFFICE

ALTHEA S. MOONEY, OF MOSCOW, IDAHO

EDUCATIONAL DEVICE

Application filed August 15, 1927. Serial No. 213,033.

This invention relates to educational devices generally, and more particularly to a type of such devices especially adapted for self-learning to spell correctly as well as to aid in or otherwise facilitate the teaching of correct spelling.

The principal object of the invention is to provide for an instrumentality of the character set forth, and one of a nature readily adapting itself to modern teaching methods which involves the visualizing of objects and subjects, as distinguished from the time-honored method of committing to memory of the usual fixed rules and formulæ of the lexicon, whereby to perfect one's self on the one hand, or a pupil or pupils under instruction, on the other hand, in correct spelling as well as to effect an increase in average individual vocabulary.

Another object of the invention is to provide for a device as hereinbefore characterized, and one involving an extremely simplified and easy method of learning to spell, or of teaching others to learn to spell, troublesome or otherwise commonly misspelled words often called "demons", whereby it will be possible that, within the usual time periods now devoted to learning or teaching of spelling, more correct spelling will become the habit generally rather than the exception among the majority of persons applying themselves to the subject with average attention and study.

A further object of the invention is to provide for a device and method of the class mentioned, and one involving the physical emphasizing or visualizing of certain letters of the alphabet from the remaining of the several letters thereof, whereby the physical characterization of these certain letters will act as a stimulus to the memory for the proper relative placing of the several letters of a particular word assembly.

Another object of the invention is to provide for an educational instrumentality wherein distinctive colors are employed for giving emphasized character to certain selected letters of the alphabet, as for instance, to the vowel and consonant letters thereof, whereby to cause these particular letters to be readily distinguished visually and to an extent that their respective positions in a word assembly will result in the proper or correct association therewith of the others of the letters of a given or particular word, as well as to otherwise greatly aid in giving to such a word its correct pronunciation.

A further object of the invention is to provide a method and means for the teaching of spelling of words and the correct and proper pronunciation thereof, wherein the consonants of the alphabet will be printed or otherwise formed in one characterization or color, and the silent consonants and the vowels in different characterizations or colors, so as to distinguish the same from the consonants, and the vowels especially one from the other, whereby the selected colors will be physiologically related to the sound of the respective letters, particularly to the vowels.

A still further object of the invention is to provide for an instrumentality of this character and class, and which will be an important adjunct in or to phonetics.

With the foregoing and other equally important objects in view, the invention resides in the certain new and useful combinations, constructions and arrangments of elements or parts as will be hereinafter more fully described, set forth in the appended claims, and illustrated in the accompanying drawings, in which:

Figure 1 is a top plan view of an assembly of certain of the capital letters of the alphabet as constructed and distinctively characterized one with respect to the other in accordance with the invention, Figure 2 is a view similar to that of Figure 1, but showing the use of small letters with identical distinctive characteristics as the capital letters in the first instance, Figures 3, 4, 5 and 6 are other similar views and each shows a different word assembly illustrative of the contrast to be visualized between the consonant letters and the vowel letters forming the same.

Figure 7 is a plan view showing the distinctive characterization of one of the silent consonant letters of the alphabet, and Figure 8 is a similar view of a word assembly showing the contrast between the consonant letters, a silent consonant letter and a vowel letter in such assembly.

Referring to the drawing, the invention, as shown therein, primarily consists in forming the several letters of the alphabet individually on separate members, cards or sheets capable of being easily and readily arranged in alphabetical or word forming groups or alignments, or the same may be printed or otherwise formed in a grouped arrangement with the several letters disposed in the order of their natural alphabetical sequence or otherwise on a blackboard, chart sheet or other surface, as may be desired or otherwise deemed to be necessary, and in any case, the consonant letters are to be distinctive from the vowel letters, and the latter letters are correspondingly distinctive one from the other. In addition to this individual distinctive characterization of the vowel letters of the alphabet, the invention also contemplates the similar distinguishing of the silent consonant letters thereof from the remainder of the consonant letters as well as from the vowel letters as aforesaid.

In carrying out the objects and purposes of the present invention, and, as shown in the drawing, the several letters of the alphabet will preferably be formed or printed individually on separate members, cards or the like, and the consonant letters are formed or printed in a distinctive color or, preferably, in black, as is exemplified by the capital letter "B" on member or card 10, in Figure 1, and the small letter "b" on the member or card 10' in Figure 2, while the vowel letters "A"; "E"; "I"; "O" and "U" will be similarly formed or printed on the members or cards 11, 12, 13, 14 and 15, in Figure 1, and their corresponding small letters on members or cards 11', 12', 13', 14' and 15', as in Figure 2, but in colors differing from that used in the forming or printing of the consonant letters "B" and "b", as for instance, "A" and "a" in red; "E" and "e" in green; "I" and "i" in yellow; "O" and "o" in blue; and "U" and "u" in purple, as is clearly illustrated in the several figures of the drawing. Also, the invention contemplates the distinguishing of those of the consonant letters which are silent in certain common words of the lexicon, as, for instance, the letter "t" in the word "scratch". See Figure 7. These silent consonant letters are to be given a distinctive coloring, as for instance gray, to distinguish them from the other of the consonant letters not so commonly silent as well as the vowel letters of the alphabet. The colors, as thus determined upon for the different vowels particularly, are aimed to be, through the continued application of the proposed method of teaching, physiologically related to the sounds of these letters, so that the well recognized and seemingly illogical spelling of words in English, and especially those words in which these letters appear, will be better understood and the correct pronunciation of the same acquired, particularly by persons speaking in other tongues.

In order to fully demonstrate the application of the invention and to disclose the method involved in such application, the words "sophomore", as in Figure 3; "separate", as in Figure 4; and "exasperate", as in Figure 5, are here employed as examples and are illustrative of the same. In the word "sophomore" as formed by arranging the proper letter cards in aligned assembly, as in Figure 3, and if capitalized, the consonant letter "S", on a card 10 will be first used, and the other consonant letters "p", "h", "m" and "r", on cards 10' will be arranged in proper sequence, while three of the vowel letters "o", on cards 14' and the one vowel letter "e" on a card 12', will be selected, and the first "o" card interposed in edge to edge relation between the "S" card and the "p" card; the second "o" card between the "h" and "m" cards; the third "o" card between the "m" and "r" cards. Thus, there is impressed on the mind of the student that in this particular word there are three interposed "o's" and a final "e", the colors "blue" for the "o's" and "green" for the "e's" accentuating the code ratio of three "o's" to one "e". This word is usually wrongly spelled either "sophamore", "sophemore", or "sophimore", hence with the vowels "o" and "e" accentuated by the colors blue (o) and green (e) in the ratio of three "o's" and a final "e", it will be readily apparent that the visualization of the colors, representing the vowel letters in this or various word assemblies, will greatly aid the memory in determining the proper spelling of a given word, no matter how troublesome the spelling of the particular word has heretofore been to the average person. Similarly, in learning or teaching the word "separate", as in Figure 4, with the consonant letter "S" on a member or card 10, "p", "r" and "t" on members or cards 10', will be first selected, and then the vowel letters "e" and "a" on members or cards 12' and 11', each in duplicate, will be taken and interposed in proper order in the word assembly "separate". Here the impression to be gained or the code ratio to be visualized by the student is two "e's" (green) and two "a's" (red) with the "a's" to the middle or in interposed relation to the "e's". This word is most commonly misspelled "seperate". Again, in learning or teaching the word "exasperate," we have the consonant letters in black, "s", "p", "r" and "t", on cards 10', and the vowel letters "E" (green) on a card 10, and "a" (red), "e" (green), "a" (red) and "e" (green) in a code ratio of three "e's" to two "a's" in the color order of green, red, green, red and green, or with the "e's" alternating with the "a's". Further, in the word "siege", as in Figure 6, we have the occurrence of the combination of vowel letters "ie", when, with the consonant letters "S" and "g" in black, and the vowel letters "i", "e" and "e" in their respective colors, or yellow, green and green, the contrast in color is readily observable, and the relative positions of the several letters of the word will be easily fixed in mind. Here, the relation of the color yellow of "i" and the color green for the first "e", will firmly fix in mind the relative positions of these two letters and prevent confusion with the similar combination of these two letters when written "ei".

An example of a word embodying a silent consonant letter, reference is made to the word "scratch", as shown in Figure 8. Here, the consonant letters, with the single exception of the letter "t", will be in black, and the vowel letter "a" in red, while the letter "t" will be of a different color, as for instance, gray, so as to clearly distinguish it from the rest of the word.

In extending this method of learning or teaching proper spelling, the invention contemplates the convenient packaging of the cards or sheets, either with or without one or more guide charts, in sets, containing one or more complete alphabets of both capital and small letters, and including a greater number of those of the several letters most frequently required, whereby to give to each packaged set of letters a desired range of usefulness and scope. By thus arranging the letters in standardized sets, the distribution and use of the same will be facilitated.

Without further description, it is thought that the features and advantages of the invention will be readily apparent to those skilled in the art, and it will of course be understood that changes in the colors, form, proportion and minor details of construction may be resorted to, without departing from the spirit of the invention or its scope as claimed.

Having thus fully described the invention, what is claimed is:

1. An educational means of the class described consisting of a plurality of cards, each having a letter of the alphabet printed thereon, the consonant letters of the alphabet being printed correspondingly in one color and the vowel letters in colors differing one from the other and from the color employed in printing the said consonant letters.

2. An educational means of the class described comprising an alphabetical set of letter display members, having the consonant letters, the usual silent consonant letters and the vowel letters thereof colorably distinguishable from each other, the said vowel letters being similarly distinguishable one from the other.

3. An educational means of the class described comprising an alphabet display means, having the consonant letters, the usual silent consonant letters and the vowel letters thereof colorably distinguished from each other, the said vowel letters being similarly distinguishable one from the other.

ALTHEA S. MOONEY.